United States Patent
Hirota

(10) Patent No.: US 6,560,994 B1
(45) Date of Patent: May 13, 2003

(54) MOLD USED FOR MOLDING GLASS OPTICAL ELEMENTS PROCESS FOR PREPARATION OF GLASS OPTICAL ELEMENTS AND METHOD FOR REBIRTH OF MOLD

(75) Inventor: Shinichiro Hirota, Fuchu (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/116,964

(22) Filed: Jul. 17, 1998

(30) Foreign Application Priority Data

Jul. 18, 1997 (JP) .............................. 9-193873

(51) Int. Cl.[7] .............................................. C03B 11/08
(52) U.S. Cl. ..................... 65/24; 65/26; 65/27; 65/102; 65/286; 65/305; 65/374.13; 65/374.15
(58) Field of Search ..................... 65/286, 305, 374.13, 65/374.15, 27, 102, 24, 26; 425/193

(56) References Cited

U.S. PATENT DOCUMENTS

| | | | | |
|---|---|---|---|---|
| 3,792,986 A | * | 2/1974 | Scott et al. ..................... | 65/27 |
| 4,629,487 A | * | 12/1986 | Monji et al. ..................... | 65/26 |
| 4,793,953 A | * | 12/1988 | Maus ........................... | 264/2.5 |
| 4,948,627 A | * | 8/1990 | Hata ........................... | 65/374.15 |
| 5,380,349 A | * | 1/1995 | Taniguchi et al. ............. | 65/286 |
| 5,665,661 A | * | 9/1997 | Matsumoto ................... | 501/92 |
| 5,919,718 A | * | 7/1999 | Hirota et al. .................. | 501/64 |

FOREIGN PATENT DOCUMENTS

| | | |
|---|---|---|
| JP | 63-45135 | 2/1988 |
| JP | 64-83529 | 3/1989 |
| JP | 2-38330 | 2/1990 |
| JP | 2-199036 | 8/1990 |
| JP | 9-12317 | 1/1997 |
| JP | 9-118520 | 5/1997 |

OTHER PUBLICATIONS

Abstract of 63–45134(A).
Abstract of I–83529(A).
Abstract of 2–38330(A).
Abstract of 2–199036(A).
Abstract of 09012317A.
Abstract of 09118530A.

* cited by examiner

*Primary Examiner*—James Derrington
(74) *Attorney, Agent, or Firm*—Burns, Doane, Swecker & Mathis, L.L.P.

(57) ABSTRACT

Disclosed is a mold including upper and lower molds for obtaining glass optical elements by press molding a glass molding material softened by heat, in which either one of the upper and lower molds is made of a ceramic matrix and the matrix has no surface hole having a diameter of 300 microns or more on the molding surface, and a method for manufacturing glass optical elements using the mold. For example, on the upper mold 21 and the lower mold 22, formed is a β type silicon carbide having a thickness that a molding surface can be reproduced by grinding and a density of 3.20 g/cm$^3$ or more so as to include at least the molding surface facing a surface of the glass molding material G. The mold according to the invention can be reused even where pullouts occur from repetitive use.

20 Claims, 5 Drawing Sheets

MOLD USED FOR MOLDING GLASS OPTICAL ELEMENTS PROCESS FOR PREPARATION OF GLASS OPTICAL ELEMENTS AND METHOD FOR REBIRTH OF MOLD

This application claims priority under 35 U.S.C. §§119 and or 365 to 193873/1997 filed in Japan on Jul. 18, 1997; the entire content of which is hereby incorporated by reference.

TECHNICAL FIELD OF THE INVENTION

This invention relates to a mold made of a ceramic matrix and used for molding glass optical elements such as lenses. More particularly, this invention relates to a mold usable upon reproduction and a method for reproducing the mold.

BACKGROUND OF THE INVENTION

A mold used for press molding glass molded articles, which are not subject to grinding or polishing during a cold state, transfers the molding surface of the mold onto the glass surface as it is during press molding. Therefore, it is required for such a molding surface of a mold, e.g., to be capable of being finished to an optical mirror surface, to be free from rough surfaces due to oxidization even at a high temperature, and to have a mechanical strength durable against impacts when press molding.

Such a mold has been developed in various ways. For examples, Japanese Unexamined Patent Publication (KOKAI) Showa No. 63-45,135 has proposed "a mold having upper and lower molds for press molding a glass molding material, the mold characterized in that a β silicon carbide mainly having 111 face directionality is covered on a mold substrate surface for the mold corresponding to surfaces of the glass molding material."

Moreover, Japanese Unexamined Patent Publication (KOKAI) Heisei No. 1-83,529 discloses "a method for manufacturing a glass mold characterized in after a substrate material for a glass mold is fabricated into a shape corresponding to a shape of a glass molded article to be produced, a hard carbon film is formed on the substrate material by a sputter method using a graphite as a sputter target in an inert gas as a sputter gas at a substrate material temperature of 250 to 450° C."

This Publication includes the following description. A silicon carbide sintered material is used as a substrate material, and after this is roughly fabricated to a shape corresponding to a shape of the glass molded article to be produced, a silicon carbide film (thickness of 500 microns) is formed on the substrate material surface by a CVD (Chemical Vapor Deposition) method. After the surface of the silicon carbide film is finished to a shape of the glass molded article to be produced, a hard carbon film is formed thereon by a sputter method. It is described that where the hard carbon film is not formed, the glass recognizably adheres by press molding of several times, but where the hard carbon film (1000 Angstroms thickness) is formed, the glass does not adhere by press molding of 150 times, and first adherence is recognized by press molding of 200 to 300 times. Because the hard carbon film can be removed easily by oxygen plasma ashing, it is described that the mold can be advantageously reused upon reproduction by repeating removals and depositions of films.

Japanese Unexamined Patent Publication (KOKAI) Heisei No. 2-38,330 discloses an excellent adherence force is obtainable by a treatment of the molding surface of the mold with a hydrogen fluoride or an aqueous solution of its salt after the hard carbon film is removed by oxygen plasma ashing before another new hard carbon film is formed.

The silicon carbide film made by the CVD method has features that the film is dense, can be finished to an optical mirror surface, and is free from rough surfaces because, though a very surface layer is oxidized, oxidation hardly develops at high temperature. However, if the glass material is pressed so that the silicon carbide film is directly in contact with the glass material, the glass may adhere to the silicon carbide film, and the silicon carbide film may be locally scraped out (hereinafter, referred to as "pullouts").

Although mold releasing capability can be improved by formation of a mold releasing film such as a hard carbon film, such a hard carbon film is not a permanent film and requires repeating of removal and formation every about 200 times. For example, if a formed film is inhomogeneous or does not have a long life due to deviations of film formation conditions, press molding may cause occurrences of pullouts. When pullouts occur, such a mold cannot be used as it is because lens would be produced with failures to its appearance. During removal of the film, the carbon film is removed by ashing with oxygen plasma, and at that time, the surface of the silicon carbide is oxidized. Because the carbon film would lose its adherence force at the subsequent film formation if the surface of the silicon carbide were oxidized, the subsequent film is formed upon removing the oxidized layer in solving the layer with a hydrogen fluoride or an aqueous solution of its salt. Rough surfaces would occur on the surface of the silicon carbide by repeating these steps. If glass optical elements are pressed using a mold having rough surfaces, the glass molded article (lenses) may have blurs.

Thus, the molding surface made of the silicon carbide by the CVD method has relatively short life. It is therefore desired to refinish only the molding surface of the mold which already became useless and to reuse the mold. The silicon carbide film made by the CVD method normally has, even if thickly formed, a thickness of several hundreds microns, and the remaining thickness after processed is around 200 to 300 microns, and if rough surfaces are created, the film can be reproduced once or twice. However, since pullouts are formed deeply, most of the silicon carbide film may be removed by grinding if the molding surface is ground to delete the pullouts.

It is also conceivable that another silicon carbide film would be newly stacked by the CVD method on the mold to be reproduced. In this situation, however, the CVD method makes depositions not only on the molding surface of the mold made of a silicon carbide sintered material as a substrate but also on side and bottom surfaces. If the silicon carbide is formed again on the entire surface of the mold to be reproduced, the side and bottom surfaces are required to be re-fabricated with high accuracy, thereby raising costs higher. Even if the side and bottom surfaces are masked as not to form the silicon carbide, the gas may enter in the spaces, and it is difficult to protect the surfaces completely. Therefore, a process is required in which the silicon carbide film deposited on the side and bottom surfaces is removed upon fabrication, and the mold cannot be reproduced merely by forming a silicon carbide film only on a molding surface.

It is therefore an object of the invention to provide a mold easily reusable even where a molding surface is subject to impairments such as pullouts by repetitive use.

It is another object of the invention to provide a method for manufacturing glass optical elements using a mold whose molding surface can be reproduced.

SUMMARY OF THE INVENTION

This invention relates to a mold (hereinafter referred to as "first mold") having upper and lower molds for obtaining glass optical elements by press molding a glass molding material softened by heat, the mold characterized in that at least one of the upper and lower molds is made of a ceramic matrix, which has no surface hole having a diameter of 300 microns or more on a molding surface.

This invention also relates to a mold (hereinafter referred to as "second mold") having upper and lower molds for obtaining glass optical elements by press molding a glass molding material softened by heat, the mold characterized in that a portion constituting a molding surface of at least one of the upper and lower molds has a thickness such that the molding surface can be reproduced by grinding and is made of a β type silicon carbide having a density of 3.20 g/cm$^3$ or more.

This invention further relates to a method for manufacturing glass optical elements in repeating a process for press molding a glass molding material softened by heat with a mold to obtain glass optical elements, the method characterized in that the mold is made of a ceramic matrix and has a molding surface reproduced by at least grinding and that the reproduced molding surface has no surface hole having a diameter of 300 microns or more.

Moreover, this invention relates to a method for manufacturing glass optical elements in repeating a process for press molding a glass molding material softened by heat with a mold to obtain glass optical elements, the method characterized in that a portion constituting a molding surface of at least one of the upper and lower molds constituting the mold has a thickness such that the molding surface can be reproduced by grinding and that the mold has a molding surface reproduced at least by grinding and is made of a ceramic matrix made of a β type silicon carbide having a density of 3.20 g/cm$^3$ or more.

This invention also relates to a method for reproducing a mold, including upper and lower molds for obtaining glass optical elements by press molding a glass molding material softened by heat, having a portion constituting a molding surface of at least one of the upper and lower molds of a thickness such that the molding surface can be reproduced by grinding, and being made of a β type silicon carbide having a density of 3.20 g/cm$^3$ or more, the method characterized in that the impaired molding surface due to repeating of press molding is reproduced by grinding the molding surface.

DETAILED DESCRIPTION OF THE INVENTION

Figure 1:
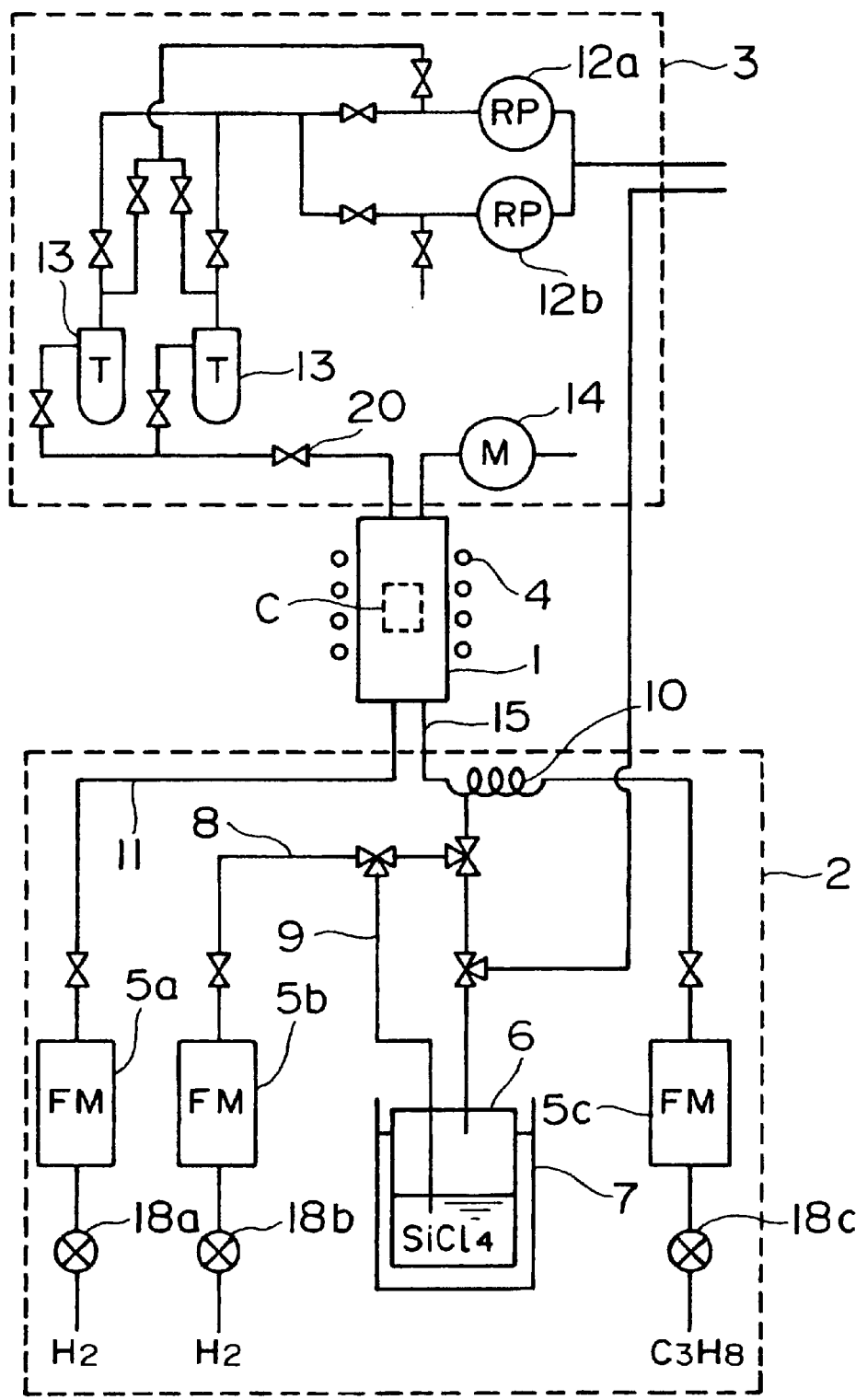
FIG. 1 is an illustration describing a CVD apparatus for forming a β type silicon carbide, used in a first embodiment, to be used for a mold.

A mold of the invention is a mold including upper and lower molds for obtaining glass optical elements by press molding a glass molding material softened by heat. A method for obtaining high precision glass optical elements directly by press molding a glass molding material softened by heat has been known, and the invented mold is applicable notwithstanding conditions for molding and glass types. The mold according to the invention includes upper and lower molds, and there is no special limitation on shapes of the upper and lower molds. The invented mold can have some member, other than the upper and lower molds, such as a sleeve for positioning (aligning center) the molds without disturbing traveling of the upper and lower molds, a pushing mold for pushing the upper or lower mold, and so on.

The first mold of the invention has a feature that at least one of the upper and lower molds is made of a ceramic matrix, which has no surface hole having a diameter of 300 microns or more on a molding surface. In this invention, there is no special limitation on the ceramic matrix as far as having a density such that a molding surface of the mold can be formed merely by grinding or polishing and a strength and hardness durable as a matrix for a mold. For example, exemplified are SiC, $Si_3N_4$, $Al_2O_3$, mullite, $ZrO_2$, $Al_2O_3$—$TiO_2$, and so on. The matrix can be made of a ceramic manufactured not only by sintering but also by a CVD method or other deposition methods, but in consideration with density, strength, and hardness, a matrix is preferably made by the CVD method.

The ceramic matrix can be made where the whole mold is made of a ceramic, as a matter of course, and also where a portion of the mold including a molding surface is made of a ceramic and the strength of the mold depends on the ceramic. According to the first mold of the invention made of such a ceramic, even where repetitive use causes rough surfaces and pullouts, the mold can be reused upon reproduction of the molding surface by grinding a part of the ceramic matrix. Where a portion of the upper and lower molds is made of such a ceramic, a thickness of the portion made of the ceramic is of a degree that the molding surface can be reproduced by grinding, and the minimum thickness is preferably in a range of, e.g., 3 to 50 mm. Where the entire upper and lower molds are made of a ceramic, the thickness of the ceramic upper or lower mold is also, preferably in a range of 3 to 50 mm.

In the first mold of the invention, the ceramic matrix has no surface hole having a diameter of 300 microns or more on the molding surface. The existence or non-existence of such surface holes is an index indicating density of the ceramic matrix. The holes are what are called to as "dots," which are different from line scars and frequently bubbles or crystal grains in the matrix appeared on the surface. In the first mold, the molding surface obtained after grinding or polishing the molding surface of the ceramic matrix is required to be in State 1 as described below, and preferably in State 2 to 21, more preferably in State 14 to 21, and more further preferably in State 17 to 21.

State 1: no surface hole having a diameter of 300 microns or more exists.

State 2: in State 1, there are five or fewer (including zero) surface holes having a diameter equal to or greater than 200 microns and smaller than 300 microns.

State 3: in State 1, there are two or fewer (including zero) surface holes having a diameter equal to or greater than 200 microns and smaller than 300 microns.

State 4: in State 1, no surface hole having a diameter equal to or greater than 200 microns and smaller than 300 microns exists State 5: in States 2 to 4, there are five or fewer (including zero) surface holes having a diameter equal to or greater than 150 microns and smaller than 200 microns.

State 6: in States 2 to 4, there are two or fewer (including zero) surface holes having a diameter equal to or greater than 150 microns and smaller than 200 microns.

State 7: in States 2 to 4, no surface holes having a diameter equal to or greater than 150 microns and smaller than 200 microns exists.

State 8: in States 2 to 7, there are five or fewer (including zero) surface holes having a diameter equal to or greater than 100 microns and smaller than 150 microns.

State 9: in States 2 to 7, there are two or fewer (including zero) surface holes having a diameter equal to or greater than 100 microns and smaller than 150 microns.

State 10: in States 2 to 7, no surface holes having a diameter equal to or greater than 100 microns and smaller than 150 microns exists.

State 11: in States 2 to 10, there are five or fewer (including zero) surface holes having a diameter equal to or greater than 50 microns and smaller than 100 microns.

State 12: in States 2 to 10, there are two or fewer (including zero) surface holes having a diameter equal to or greater than 50 microns and smaller than 100 microns.

State 13: in States 2 to 10, no surface holes having a diameter equal to or greater than 50 microns and smaller than 100 microns exists.

State 14: in States 2 to 13, there are five or fewer (including zero) surface holes having a diameter equal to or greater than 30 microns and smaller than 50 microns.

State 15: in States 2 to 13, there are two or fewer (including zero) surface holes having a diameter equal to or greater than 30 microns and smaller than 50 microns.

State 16: in States 2 to 13, no surface holes having a diameter equal to or greater than 30 microns and smaller than 50 microns exists.

State 17: in States 2 to 16, there are five or fewer (including zero) surface holes having a diameter equal to or greater than 3 microns and smaller than 30 microns.

State 18: in States 2 to 16, there are two or fewer (including zero) surface holes having a diameter equal to or greater than 3 microns and smaller than 30 microns.

State 19: in States 2 to 16, no surface holes having a diameter equal to or greater than 3 microns and smaller than 30 microns exists.

State 20: in States 1 to 19, the total of diameters of surface holes is equal to and smaller than 200 microns.

State 21: in States 1 to 19, the total of diameters of surface holes is equal to and smaller than 200 microns.

It is to be noted that a surface hole with a diameter equal to or greater than 30 microns can be confirmed by naked eyes under light of a 60 watt bulb. The diameter of the surface hole in States 17, 18 is a diameter of a circumcircle of the surface hole.

The matrix of the above mold preferably has a high hardness at a high temperature range. For example, it preferably has a Vickers hardness of 700 kg/mm$^2$ or more in a temperature range from the room temperature to 100° C., more preferably of 1000 kg/mm$^2$ or more in the same temperature range, further more preferably, of 2000 kg/mm$^2$ or more in the same temperature range, and still further more preferably, of 3000 kg/mm$^2$ or more. Moreover, the ceramic matrix preferably has a modulus of 400 GPa or more, a strength against deformation of 120×10$^6$ MN/kg or more, and a thermal conductance rate of 200 W/m·K or more.

The mold matrix is preferably made of a β type silicon carbide formed by a CVD method. The β type silicon carbide formed by the CVD method has a density of 3.20 g/cm$^3$ or more, which is close to 3.21 g/cm$^3$ as a theoretical density, and its property such as Vickers hardness or the like satisfies the above conditions.

The first mold of the invention can have a carbon thin film immediately above the molding surface. As a carbon thin film, for example, a carbonic mold releasing film of at least one layer of amorphous and/or crystal, graphite and/or diamond structure, including or excluding a C—H bonding can be exemplified. Such a carbon film can be directly formed on the molding surface of the ceramic matrix by way of a sputtering method, a plasma CVD method, a CVD method, an ion plating method, or the like. Detail of the carbon thin film will be described later in a description for a second mold.

The second mold of the invention has a feature that a portion constituting a molding surface of at least one of the upper and lower molds has a thickness such that the molding surface can be reproduced by grinding and is made of a β type silicon carbide having a density of 3.20 g/cm$^3$ or more. In the second mold of the invention, a portion constituting a molding surface of at least one of the upper and lower molds, or in other words, a part of the upper and lower molds, is made of the β type silicon carbide, or the whole of the upper mold and/or the lower mold is made of the β type silicon carbide. According to the second mold of the invention having such a portion made of the β type silicon carbide, even where repetitive use causes rough surfaces or occurrences of pullouts, the molding surface can be reproduced by grinding the layer of the β type silicon carbide to make the mold re-useable.

The portion made of the β type silicon carbide where the part of the upper and lower molds is made of the β type silicon carbide has a thickness such that the molding surface can be reproduced by grinding, and the minimum thickness is preferably in a range of, e.g., 3 mm to 50 mm. The upper or lower mold where the whole of the upper or lower mold is made of the β type silicon carbide preferably has a thickness in a range of 3 mm to 50 mm, similarly.

Although the number of reproductions can be increased more as the thickness is thicker, manufacturing the mold becomes more difficult as the thickness becomes thicker, and therefore, from a practical view, the above range is preferred. That is, if the portion made of the β type silicon carbide has a thickness (minimum thickness) of 3 mm, the mold can be reused ten times or so even where the molding surface is ground off by about 200 microns for reproduction where pullouts of about 100 micron depth occur. Moreover, for example, if the thickness of the β type silicon carbide where the β type silicon carbide is made by a CVD method exceeds 50 mm, the grown grains become larger, thereby making the layer difficult to obtain a desired density. From the same reason, the thickness is preferably of 3 to 40 mm. This invention can use a layer having largely grown grains by placing (or namely, reversing) largely grown ends on the side of the molding surface.

The β type silicon carbide forming the mold has a density of 3.20 g/cm$^3$ or more. The β type silicon carbide having such a density can be formed by, e.g., a CVD method. The β type silicon carbide is not limited to what is produced by the CVD and can be produced by other method as far as having a density of 3.20 g/cm³ or more. The theoretical density of a β type silicon carbide is 3.21 g/cm³, and a β type silicon carbide having a density close to this theoretical density is preferred.

In a further preferred embodiment of the invention, a carbonic mold releasing film of at least one layer of amorphous and/or crystal, graphite and/or diamond structure, including or excluding a C—H bonding is formed on the molding surface. Such a carbon film can be formed by way of a sputtering method, a plasma CVD method, a CVD method, an ion plating method, or the like.

As such a carbonic mold releasing film, a hard carbon film as set forth in Japanese Unexamined Patent Publication, Heisei No. 1-83,529, or an i-carbon film as set forth in Japanese Unexamined Patent Publication, Heisei No. 2-199,036, can be used. Such films can be made and removed as set forth in above Publications and therefore allow the molds to be used repeatedly.

Where a film is formed by a sputtering method as disclosed in Japanese Unexamined Patent Publication, Heisei No. 1-83,529, a sputtering is preferably made under substrate temperature of 250 to 600° C., RF power density of 5 to 15 W/cm², vacuum degree during sputtering of $5 \times 10^{-4}$ to $5 \times 10^{-1}$ torr with a graphite as a sputter gas. By use of such a sputtering method, a hard carbon film of, e.g., 500 to 1000 angstroms can be formed.

Where a film is formed by a microwave plasma CVD method, the film is preferably formed under conditions of substrate temperature of 650 to 1000° C., microwave power of 200 W to 1 kW, gas pressure of $10^{-2}$ to 600 torr, in use of a methane gas and a hydrogen gas as source gases.

Where a film is formed by an ion plating method disclosed in Japanese Unexamined Patent Publication, Heisei No. 2-199,036, it is desired that the substrate temperature is set to 200 to 450° C. and that a benzene gas is ionized. An i-carbon film can be formed with 500 to 1000 angstroms using the ion plating method.

Thus, a glass material is pressed by using, only prescribed times, a mold in which a hard carbon film or i-carbon film is formed on the molding surface to mold glass optical elements, and subsequently, the mold can be reproduced by removing and reproducing such a film using a method disclosed in Japanese Unexamined Patent Publication, Heisei No. 2-38,330. At that time, for example, after the carbon thin film is removed, the mold is reproduced by grinding or the like, and then another carbon thin film can be formed thereon.

The invented mold is made of a ceramic such as the β type silicon carbide as described above so that the matrix including an impaired molding surface due to repeating of press molding can be reproduced by a method including a step of grinding the molding surface. That is, the molding surface can be reproduced by the method including the step of grinding the molding surface where the molding surface is formed of the ceramic such as the β type silicon carbide having a thickness such that the molding surface can be reproduced by grinding. The impairment produced at the molding surface can be rough surfaces, scars, pullouts, and glass adherence.

In the mold of the invention, the shape of the mold made of the ceramic such as the β type silicon carbide can be fabricated for molding glass optical elements having a different shape. That is, the invented mold is recyclable, after used for molding glass optical elements of one shape, upon fabricating the molding surface by grinding or the like for molding glass optical elements of a different shape for molding glass optical elements of another shape.

Figure 2:
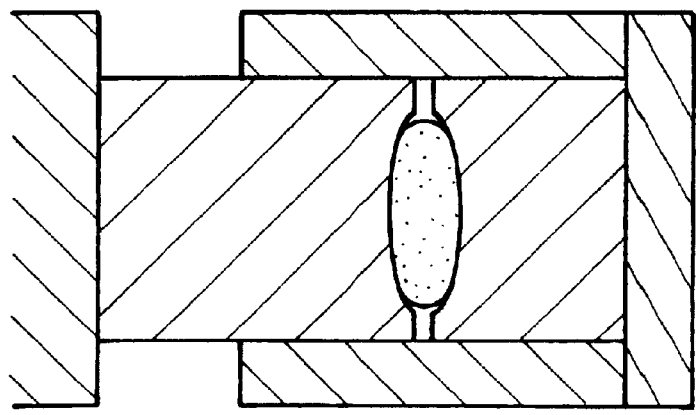
FIG. 2 is an illustration showing schematically a structure of a molding apparatus according to a second embodiment.
Figure 2:
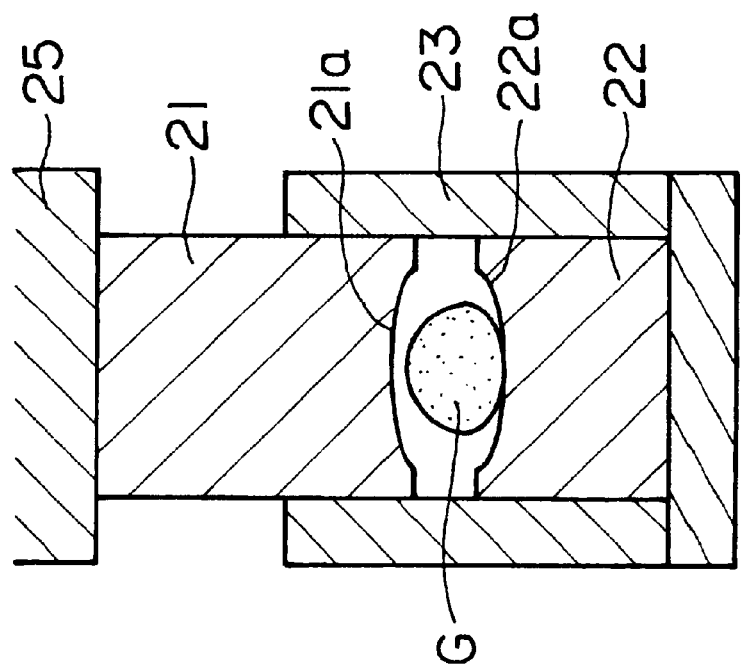
Figure 3:
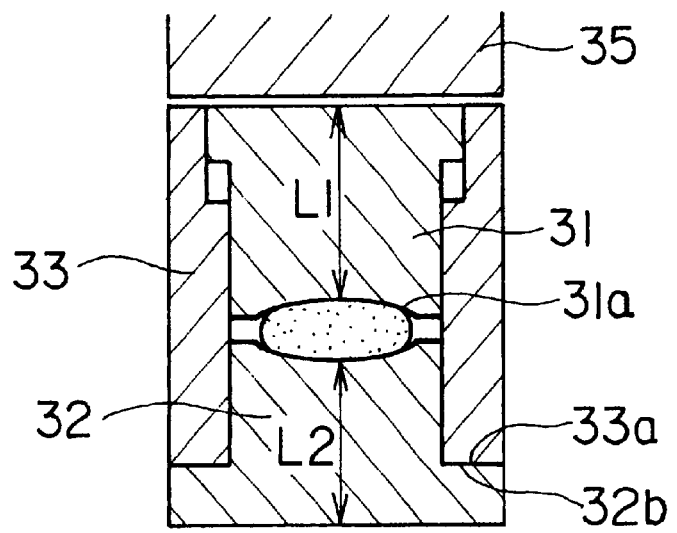
FIG. 3 is an illustration showing schematically a structure of a molding apparatus according to a third embodiment.
Figure 4:
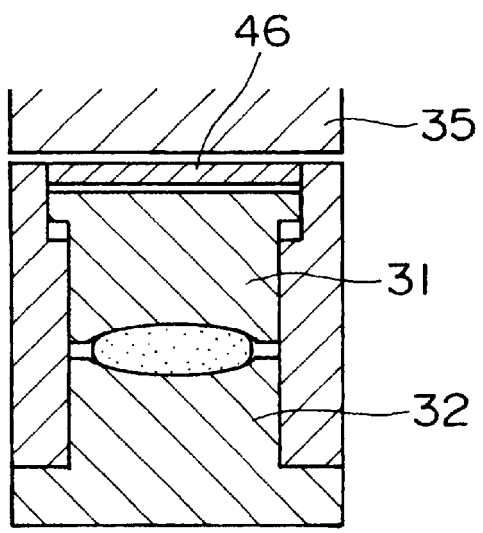
FIG. 4 is an illustration showing schematically a structure of a molding apparatus according to a fourth embodiment.

The mold of the invention can be made, for example, in which an end face of a disc constitutes the molding surface (e.g., the upper mold of the mold in FIG. 2), or in which an end face of a disc constitutes the molding surface and in which a projection projecting in the radial direction of the mold is formed at an end opposite to the molding surface (e.g., the upper and lower molds of the mold in FIGS. 3, 4). It is to be noted that the shape of the upper and lower molds is not limited to a disc (cylindrical) shape.

In the latter case, the surface of the projection parallel to the molding surface can be ground by substantially the same thickness as the molding surface. The projection operates as a stopper to a sleeve. If the molding surface of the upper or lower mold is re-fabricated by grinding, the upper or lower mold becomes shorter in its height, and consequently, the obtained glass molded article has a thicker center thickness. The thicker center thickness of the glass molded article due to a reduced thickness of the mold can be adjusted where the surface of the projection formed on the upper or lower mold, parallel to the molding surface, can be ground by substantially the same thickness as the molding surface.

As described in embodiments, a thickness can be adjusted in substantially the same manner by adjusting the height of the sleeve without grinding the projection. A pressing stop position (determining a thickness of glass after press molding) of the upper mold can be maintained using a spacer when necessary in substantially the same manner as before grinding for reproduction.

The mold of the invention can have a height adjusting member for adjusting a size between two molds produced by reproduction or fabrication of the molding surfaces. Fabrication of the molding surfaces by grinding or the like to reproduce the molding surfaces as described above will reduce the height of the mold. To adjust this reduction of the height, a height adjusting member can be provided. This member allows the glass optical elements to maintain a prescribed thickness. The height adjusting member can be, e.g.., a spacer attachable to at least one of the upper and lower molds. The height adjusting member can also be a sleeve defining movement of a pressing member for pressing at least one of the upper and lower molds, and the length of the sleeve is adjustable. As the above spacer, a foil or plate can be used, and there is no special limitation on a material for the spacer, but a metal, ceramic, etc. can be used. For example, where the spacer is made of a foil, the height can be adjusted by placing a sheet or two or more sheets of the foil to a top of the upper mold or a bottom of the lower mold, and where the spacer is made of a plate, the height can be adjusted by inserting a thicker plate than a plate before reproduction in replacing the plate before reproduction with the thicker plate. At that time, the ceramic is not limited to the same material as a dense material including the molding surface.

This invention also includes a method for reproducing a mold, including upper and lower molds for obtaining glass optical elements by press molding a glass molding material softened by heat, having a portion constituting a molding surface of at least one of the upper and lower molds of a thickness such that the molding surface can be reproduced by grinding, and being made of a β type silicon carbide having a density of 3.20 g/cm³ or more, in which the impaired molding surface due to repeating of press molding is reproduced by grinding the molding surface. The impairment occurred on the molding surface can be rough surfaces, scars, pullouts, and glass adherence.

Moreover, according to the invention, a mold including upper and lower molds for obtaining glass optical elements by press molding a glass molding material softened by heat, having a portion constituting a molding surface of at least one of the upper and lower molds of a thickness such that the molding surface can be reproduced by grinding, and being made of a β type silicon carbide having a density of 3.20 g/cm³ or more can be fabricated for molding glass optical elements having a different shape. That is, a part or the whole of the molding surface of a portion made of the β type silicon carbide of at least one of the upper and lower molds can be ground for molding glass optical elements having a different shape.

According to the invention, a method for manufacturing glass optical elements in repeating a process for press molding a glass molding material softened by heat with a mold to obtain glass optical elements, the method characterized in that the mold is made of a ceramic matrix and has a molding surface reproduced by at least grinding and that the reproduced molding surface has no surface hole having a diameter of 300 microns or more, can be provided.

Furthermore, according to the invention, a method for manufacturing glass optical elements in repeating a process for press molding a glass molding material softened by heat with a mold to obtain glass optical elements, the method characterized in that a portion constituting a molding surface of at least one of the upper and lower molds constituting the mold has a thickness such that the molding surface can be reproduced by grinding and that the mold has a molding surface reproduced at least by grinding and is made of a ceramic matrix made of a β type silicon carbide having a density of 3.20 g/cm³ or more, can be provided.

The mold to be thus reproduced is the second mold of the invention. Such a method for manufacturing glass optical elements in repeating a process for press molding a glass molding material softened by heat with a mold to obtain glass optical elements has been known, and known methods (e.g., methods as set forth in Japanese Unexamined Patent Publication, Heisei No. 9-118,530, and Japanese Unexamined Patent Publication, Heisei No. 9-12,317) can be used as they are.

In the method for manufacturing optical elements of the invention, optical elements are manufactured using the mold of the invention, which has the molding surface reproduced by at least grinding after used for manufacturing glass optical elements. Such reproduction of the mold by grinding or polishing can use an ordinary method that has been used in fabrication of the β type silicon carbide.

According to the invention, a mold in which a ceramic such as a β-SiC having a desired molding surface serves as a matrix is obtained by producing a β-SiC disc from the CVD and grinding it (in some case, additionally polishing it). Therefore, even if pullouts occur on the molding surface due to repetitive pressings, the mold can be reproduced by grinding off the molding surface by a prescribed thickness. In addition, by changing the shape of the molding surface, the mold an be reproduced as a mold for molding other glass optical elements.

Furthermore, according to the invention, a hard carbon film or the like is formed on the molding surface of the mold in which a ceramic such as β-SiC serves as a matrix. This structure ensures even good molding releasing ability.

EMBODIMENTS

Hereinafter, referring to the drawings, embodiments of the invention are further described.

First Embodiment

FIG. 1 is an illustration describing a CVD apparatus for forming a β type silicon carbide (β-SiC) to be used for a mold of the embodiment according to the invention. As shown in FIG. 1, this CVD apparatus has a vertical quartz glass reaction tube 1 with a gas feed line 2 arranged on the one end and a vacuum exhaust line 3 arranged on the other end.

A work coil 4 is formed at the quartz glass reaction tube 1. A carbon heater (not shown) is arranged inside the quartz glass reaction tube 1 and is heated at a prescribed by high frequency induction heating of 15 kw and 400 Hz. A disc C made of carbon serving as a base is heated by indirect heating from the carbon heater.

Source gases $H_2$, $C_3H_8$ in the gas feed line 2 are supplied to the reaction tube 1 from the bottom of the tube through flowmeters 5a, 5b, 5c. Meanwhile, a bubbler 6 for $SiCl_4$ as a source is set in a thermostat bath 7 for keeping 20° C., and the source gas $SiCl_4$ is carried by $H_2$ gas passing through passages 8, 9 into the reaction tube 1. The $SiCl_4$, $H_2$, and $C_3H_8$ gases, after mixed at a mixer 10, are introduced in the reaction tube 1. With this embodiment, a $H_2$ line as separate line (passage 11) is prepared to feed the gas directly to quartz reaction tube 1 to keep the whole $H_2$ amount constant. The vacuum exhaust line 3 includes oil rotary pumps 12a, 12b, thereby vacuuming the reaction tube 1. Traps 13, 13 are provided between the oil rotary pumps 12a, 12b and the reaction tube 1, thereby removing not yet reacted $SiCl_4$ and reaction by-product HCl, respectively. The pressure in the reaction tube 1 is controlled by a manometer 14.

In this embodiment, $SiCl_4+H_2$ gases ($SiCl_4$: $H_2$=1:2, as mole ratio) are supplied at 900 ml/min and $C_3H_8$ gas is supplied at 60 ml/min, through a feeding pipe 15, while $H_2$ gas is supplied at 450 ml/min through a feeding pipe 11. A β-SiC is synthesized for 240 hours under base heating temperature of 1300 to 1650° C. and whole furnace pressure of 5 to 300 Torr. The obtained β-SiC has a thickness of 30 to 35 mm. Table 1 shows conditions of base heating temperature and whole furnace pressure, and observation results and results of X ray diffraction researches on orientation on deposition surfaces. The thickness is controlled by time, and it is preferably within about 40 mm as described above because grown grains unfavorably become larger if it is too thick. The density of the β-SiC was 3.20 g/cm³ or more.

TABLE 1

| Temperature | Pressure (Torr) | | | |
|---|---|---|---|---|
| (° C.) | 5 | 30 | 100 | 300 |
| 1300 | — | O | O | O |
| 1350 | — | O | O | O |
| 1450 | X | X | O | O |
| 1550 | X | X | O | O |
| 1650 | — | X | X | X |

— : No deposition
O : Cone shape (having greater 111 face orientation)
X : Facet shape (having greater 220 face orientation)

In the above embodiment, the CVD apparatus was of an experimental furnace. Where a furnace for mass production is used, the reaction tube may be formed with multiple carbon bases, thereby synthesizing more β-SiC to improve productivity.

Manufacturing a mold from the β-SiC disc thus obtained by the CVD is described next. First, the base C made of carbon is taken out of the reaction tube 1, and by crashing it, a β-SiC disc is taken out with a thickness of 30 to 35 mm. Upper and lower molds 21, 22 can be manufactured with an outer diameter of about 25 mm and a height of 33 mm as shown in, e.g., FIG. 2, by grinding the disc. The molding surfaces (surfaces for forming surfaces of the glass optical elements) 21a, 22a are finished with a high shape precision and ground, and then slightly polished to be finished to a mirror surface of surface roughness Rmax of 50 angstroms or less. In FIG. 2, the surface shape of the molding surface 21a of the upper mold 21 is aspherical, and the surface shape of the molding surface 22a of the lower mold 22 is spherical.

In this embodiment, furthermore, a carbonic mold releasing film is preferably formed on molding surfaces of the molds (the upper mold 21 and the lower mold 22) made of the β-SiC. This carbonic mold releasing film is formed of at least one layer of a carbonic molding releasing film having an amorphous, graphite and/or diamond structure.

Hereinafter, embodiments relating to a mold, reprocessing, and reuse are described.

Second Embodiment

FIG. 2a is an illustration showing a state that, in the second embodiment, a glass molding material (barium borosilicate glass; transition point 545° C., sag point 585° C.) G is set to a molding apparatus constituted of an upper mold 22, a lower mold 22, a sleeve (shell block) 23 (herein, it is a silicon carbide sintered material). The upper and lower molds 21, 22 were obtained upon forming a β-SiC having a density of 3.20 g/cm$^3$ using a CVD method as well as in the first embodiment and grinding the SiC to have a prescribed shape. A carbon thin film same as the first embodiment was formed on the molding surface of the upper and lower molds.

In an example shown in FIG. 2, the mold and the like are heated using a resistance heater (not shown) from the periphery of the upper and lower molds 21, 22. When the mold was heated up to 640° C., a press head 25 was moved down to press the glass molding material and stopped pressing when the material was expanded to have a prescribed thickness (see, FIG. 2(b)), and then the press head 25 was moved up. After immediately cooling below the glass transition point or less, the mold was transferred and taken out of an opening, and then the mold was exploded to pick up glass optical elements (lenses). This press molding was made in a non-oxidizing gas atmosphere.

Where the glass optical elements were successively produced by repeating the above operations, pullouts of a diameter of about 200 microns and a depth of about 100 microns occurred on the molding surfaces. Therefore, the molding surfaces are scraped off by about 200 microns to reprocess the mold, thereby reproducing the mold.

It is to be noted that the lenses molded in the first embodiment were bi-convex lenses having an outer diameter of 17 mm at a time of pressing, which are used upon centered to have 15 mm diameter.

The SIC molding surface on the mold had no surface hole of a diameter of 30 microns (a limit observable by naked eyes) or more during manufacture and after reproduction. After this mold was used in subjecting to ten thousand times pressing, it was in a state that the mold had only a couple of small holes of a diameter of 30 microns.

Third Embodiment

FIG. 3 is an illustration showing a structure of a molding apparatus according to the third embodiment. As shown in FIG. 3, in this embodiment, a sleeve 33 limits down movement of a press head 35 by contacting to the head, thereby determining the thickness of the glass optical elements to be molded. The upper and lower molds 31, 32 were obtained by forming a β-SiC having a density of 3.21 g/cm$^3$ using the CVD as well as in the first embodiment and by grinding the SiC to have a prescribed shape.

In this embodiment, where the glass optical elements were successively produced by repeating the above operations, pullouts occurred on the molding surface 31a of the upper mold 31. The molding surface of the upper mold was therefore ground to be reproduced. Because the height size (L1) of the upper mold 31 was shortened due to this reproduction, a bottom 33a of the sleeve 31 was also ground off in the same manner to adjust the molded articles (glass optical elements) to have a prescribed thickness, thereby reproducing the mold. Instead of grinding off the bottom 33a of the sleeve 33, grinding off a surface 32a of a projection of a lower mold 32 in contact with the bottom 33a of the sleeve 33 may adjust the elements to have a prescribed thickness.

Fourth Embodiment

FIG. 4 is an illustration showing a structure of a molding apparatus according to the fourth embodiment. In this embodiment, although the manufacturing method for the upper and lower molds and their structures are substantially the same as those in the second embodiment, the articles (glass optical elements) were adjusted to have a prescribed thickness by disposing a metal or ceramic spacer 46 in a disc shape to a top of the upper mold where the height size (L1 or L2) of the upper or lower mold 31, 32 became shorter by grinding.

Fifth Embodiment

Figure 5:
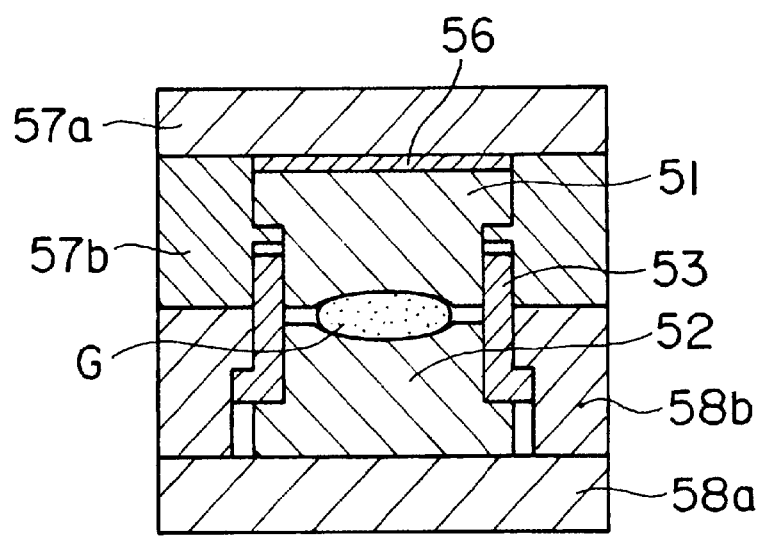
FIG. 5 is an illustration showing schematically a structure of a molding apparatus according to a fifth embodiment.

FIG. 5 is an illustration showing a structure of a molding apparatus according to the fifth embodiment. As understood from FIG. 5, also in this embodiment, the thickness of the articles (glass optical elements) is adjusted by using a spacer 56.

As shown in FIG. 5, in this molding apparatus, a sleeve 53 fitting to an upper mold 51 during press molding is arranged on an outer periphery side of a lower mold 52. The upper mold 51 is attached to upper major blocks 57a, 57b, while the lower mold 52 is attached to lower major blocks 58l, 58b. The upper major block 57 and the lower major block 58 are attached to upper and lower press shafts, respectively.

In this embodiment, a glass molding material preheated at a strain point (about 490° C.) or below was mounted on the lower mold 52 on a lower side of a molding chamber (not shown) containing the molding apparatus thus structured. While the material was moved up, the upper and lower major blocks 57, 58 were heated up by high frequency induction heating to heat the upper and lower molds 51, 52 and the glass material G at about 640° C. from thermal conductance by way of those upper and lower major blocks, and then the glass material G was pressed.

Subsequently, after the glass material was immediately cooled below the glass transition point or below, the molded glass optical elements (lenses) were released from the mold and taken out of the lower portion of the molding chamber. In this embodiment, the used upper mold 51 and lower mold 52 were of 25 mm in size, respectively.

Sixth Embodiment

Figure 6:
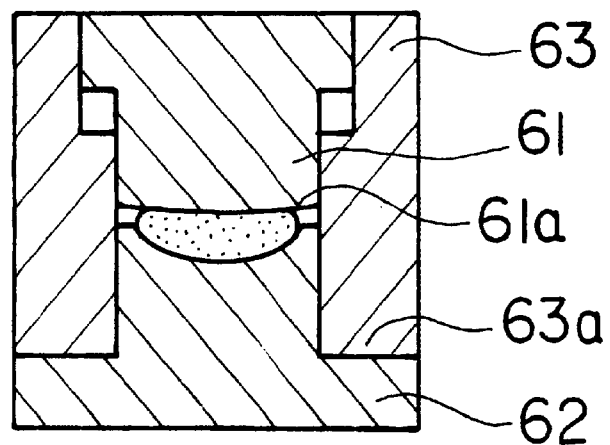
FIG. 6 is an illustration showing schematically a structure of a molding apparatus according to a sixth embodiment.

FIG. 6 is an illustration showing a structure of a molding apparatus according to the sixth embodiment. In this embodiment, the mold that has used repetitively in the third embodiment was fabricated as to change the shape of the molding surface and thereby diverted to a mold for a lens having a different surface shape. That is, the mold for molding a meniscus lens was obtained by fabricating the mold for molding the bi-convex lens.

To change the curvature of the lower mold, the molding surface of the lower mold 32 in FIG. 3 is re-fabricated, and the molding surface of the upper mold 31 is re-fabricated from the concave surface to a convex surface (see, reference number 61a in FIG. 5). A bottom 63a of a sleeve 63 was scraped off by a prescribed distance in accordance with the shortened heights of upper and lower molds 61, 62 by those re-fabrications, and/or in order to obtain a meniscus lens having a prescribed thickness.

Thus, where a certain mold is reproduced to another mold having a different shape, and where a carbonic mold releasing film (e.g., hard carbonic film, or i-carbon film) is formed on the molding surface, glass optical elements (lenses) of a press outer diameter of 23 mm were obtained and were centered to have 21 mm diameter at a subsequent step.

In the above second to sixth embodiments, the outer diameter of the upper and lower molds and the inner diameter of the sleeve are fixed to 25 mm, and the outer diameter of the completed product is determined by centering the glass at a subsequent step where the glass is made not so expanded during pressing as to contact to the inner surface of the sleeve. Therefore, a mold having the same structure can produce lenses of various shapes having various diameters of 25 mm or less, so that the mold can be reused and standardized and is very effective for reducing total costs of the mold.

The glass is made not in contact with the inner surface of the sleeve, so that pullouts never occur on the sleeve.

Seventh Embodiment

Figure 7:
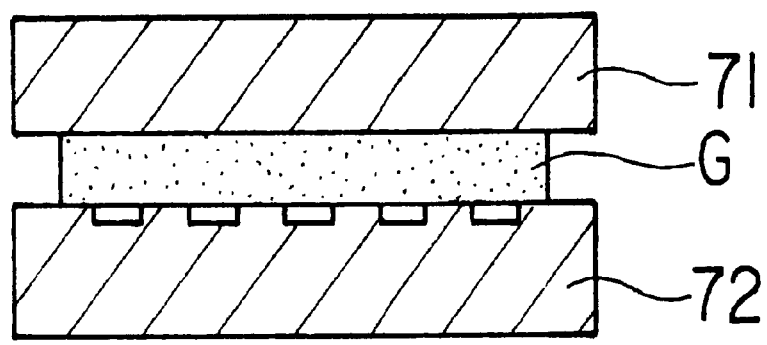
FIG. 7 is an illustration showing schematically a structure of a molding apparatus according to a seventh embodiment.

FIG. 7 is an illustration showing a structure of a molding apparatus according to the seventh embodiment. In this embodiment, two β-SiC discs (density is 3.21 g/cm³) having an outer diameter 60 mm and a thickness of 5 mm made by the CVD method were prepared, and opposing surfaces were ground to be flat surfaces, respectively. One sheet, between two discs, was used as an upper mold 71, and the other sheet was formed with fine grooves 73 of a width of 1 micron and a depth of 0.1 micron, by making exposure and development upon coating a resist and by dry etching the surface with $CF_4$ gas. A carbonic mold releasing film was coated on the surface and used as a lower mold 72. A glass molding material ground to a flat surface was mounted on the lower mold 72 and was press molded with the upper and lower molds 71, 72, and thereby an article of an outer diameter of about 50 mm to which fine patterns were transferred was obtained. By repeating molding, cracks occurred at a corner of the groove of the lower mold 72. The molding surface of the lower mold was re-fabricated and reused for press molding.

Thus, according to the seventh embodiment, glass optical elements other than lenses can be molded.

This invention is not limited to the above embodiments and can be modified in various ways within a scope of the invention as set forth in claims, and such modifications are also included in the scope of the invention, as a matter of course.

According to the invention, a re-useable and easy mold and a method for reproducing the mold can be provided where the molding surface has impairments such as pullouts due to repetitive use. Moreover, according to the invention, a mold capable of re-fabricating a molding surface for glass optical elements having a different shape and a method for reproducing the mold can be provided.

What is claimed is:

1. A method of manufacturing glass optical elements by press molding a glass molding material with a press molding apparatus comprising upper and lower molds, comprising:
   preparing the upper and lower molds;
   repeating a process of press molding the glass molding material with the upper and lower mold; and
   reproducing at least one of molding surfaces of the upper or lower mold, when the
molding surface is impaired due to the repetition of the molding; wherein at least one of the upper and lower molds comprises a matrix having a portion consisting essentially of β silicon carbide having a density of at least 3.20 g/cm³ whereby a molding surface is formed on the portion, said molding surface having a surface roughness in terms of Rmax of 50 angstrom or less, and the reproducing comprises grinding or polishing the impaired molding surface.

2. The method of claim 1, wherein preparing the upper and lower mold comprises forming the portion consisting essentially of β silicon carbide by CVD method.

3. The method of claim 1, wherein preparing the upper and lower mold comprises forming a carbon film on a molding surface of each of the upper and lower mold.

4. The method of claim 1, wherein the reproducing comprises removing the carbon film on the impaired molding surface before the grinding or polishing.

5. The method of claim 2, wherein the CVD method is carried out with a base temperature ranging from 1300 to 1650° C. and the pressure in a furnace ranging from 5 to 300 Torr.

6. The method of claim 2, wherein the β silicon carbide formed by CVD method has a deposited surface in a cone shape with orientation property on (111) surface.

7. The method of claim 1, wherein the whole matrix is substantially made of β silicon carbide.

8. The method of claim 1, wherein the minimum thickness of the portion made of β silicon carbide is 3 to 50 mm.

9. The method of claim 1, wherein the number of surface holes on the molding surface having a diameter of 50 μm or more and less than 100μ is 5 or less.

10. The method claim 1, wherein the portion consisting essentially of β silicon carbide has a thickness sufficient for obtaining a reproduced molding surface by grinding or polishing the impaired molding surface.

11. A method of manufacturing glass optical elements by press molding a glass molding material with a press molding apparatus comprising upper and lower molds, comprising:
   preparing the upper and lower molds;
   repeating a process of press molding the glass molding material with the upper and lower molds;
   reproducing at least one molding surface of the upper or lower mold, when the molding surface is impaired due to the repetition of the molding; and
   adjusting the press molding apparatus so that the thickness of molded element is maintained;
wherein at least one of the upper and lower molds comprises a matrix having a portion consisting essentially of β silicon carbide having a density of at least 3.20 g/cm³ whereby a molding surface is formed on the portion, the reproducing comprises grinding or polishing the impaired molding surface, and the adjusting comprises compensating the height of upper or lower mold which was reduced due to grinding or polishing.

12. The method of claim 11, wherein preparing the upper and lower mold comprises forming the portion consisting essentially of β silicon carbide by CVD method.

13. The method of claim 11, wherein preparing the upper and lower molds comprises forming a carbon film on a molding surface of each of the upper and lower mold.

14. The method of claim 13, wherein the reproducing comprises removing the carbon film on the impaired molding surface before the grinding or polishing.

15. The method of claim 12, wherein the CVD method is carried out with a base temperature ranging from 1300 to 1650° C. and the pressure in a furnace ranging from 5 to 300 Torr.

16. The method of claim 12, wherein the β silicon carbide formed by CVD method has a deposited surface in a cone shape with orientation property on (111) surface.

17. The method of claim 11, wherein the whole matrix is substantially made of β silicon carbide.

18. The method of claim 11, wherein the minimum thickness of the portion made of β silicon carbide is 3 to 50 mm.

19. The method of claim 11, wherein the number of surface holes on the molding surface having a diameter of 50 μm or more and less than 100μ is 5 or less.

20. The method of claim 11, wherein the portion made of β silicon carbide has a thickness sufficient for obtaining a reproduced molding surface by grinding or polishing the impaired molding surface.

* * * * *